United States Patent
Ono et al.

(10) Patent No.: US 9,986,222 B2
(45) Date of Patent: May 29, 2018

(54) IMAGE PROCESSING METHOD AND IMAGE PROCESSING DEVICE

(71) Applicant: Panasonic Intellectual Property Management Co., Ltd., Osaka (JP)

(72) Inventors: Hiromichi Ono, Hyogo (JP); Takeshi Ito, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 14/857,044

(22) Filed: Sep. 17, 2015

(65) Prior Publication Data

US 2016/0014389 A1 Jan. 14, 2016

Related U.S. Application Data

(63) Continuation of application No. PCT/JP2014/000908, filed on Feb. 21, 2014.

(30) Foreign Application Priority Data

Mar. 21, 2013 (JP) .................................. 2013-057613

(51) Int. Cl.
*H04N 13/00* (2018.01)
*G03B 35/02* (2006.01)
*H04N 13/02* (2006.01)

(52) U.S. Cl.
CPC ..... *H04N 13/0051* (2013.01); *H04N 13/0007* (2013.01); *H04N 13/0011* (2013.01); (Continued)

(58) Field of Classification Search
CPC ........................... H04N 13/0203; G03B 35/02
See application file for complete search history.

(56) References Cited

U.S. PATENT DOCUMENTS 8,502,863 B2 8/2013 Hoshino
2011/0018969 A1* 1/2011 Tanaka ............... H04N 5/23296
348/47
(Continued)

FOREIGN PATENT DOCUMENTS

JP 6-269025 9/1994
JP 2010-213083 9/2010
(Continued)

OTHER PUBLICATIONS

International Search Report dated May 27, 2014 in corresponding International Application No. PCT/JP2014/000908 (with English translation).

*Primary Examiner* — Obafemi Sosanya
(74) *Attorney, Agent, or Firm* — Wenderoth, Lind & Ponack, L.L.P.

(57) ABSTRACT

Provided is an image processing method in an image processing device for performing image processing on first and second perspective images forming a 3D display image and specified via selection from a group of images obtained by capturing a subject from at least three different perspectives. Adjustment processing is performed on the first perspective image based on a prescribed reference position and a capturing position related to the first perspective image, and shifts the subject in the first perspective image to a position in which the subject would appear if the capturing position were the reference position. Adjustment processing is performed on the second perspective image based on the reference position and a capturing position related to the second perspective image, and shifts the subject in the second perspective image to a position in which the subject would appear if the capturing position were the reference position.

10 Claims, 12 Drawing Sheets

(52) U.S. Cl.
CPC ..... *H04N 13/0022* (2013.01); *H04N 13/0055* (2013.01); *H04N 13/0239* (2013.01); *H04N 13/0282* (2013.01); *H04N 13/0242* (2013.01)

(56) References Cited

U.S. PATENT DOCUMENTS

| | | |
|---|---|---|
| 2012/0038753 A1 | 2/2012 | Hoshino |
| 2013/0155204 A1* | 6/2013 | Kokubun ............... G03B 35/02 348/49 |
| 2014/0022246 A1 | 1/2014 | Ono et al. |

FOREIGN PATENT DOCUMENTS

| | | |
|---|---|---|
| JP | 2011-29700 | 2/2011 |
| JP | 2012-93779 | 5/2012 |
| JP | 2012-235270 | 11/2012 |
| JP | 2012-253452 | 12/2012 |
| JP | 5133472 | 1/2013 |
| WO | 2012/026185 | 3/2012 |
| WO | 2012/137454 | 10/2012 |

* cited by examiner

IMAGE PROCESSING METHOD AND IMAGE PROCESSING DEVICE

CROSS REFERENCE TO RELATED APPLICATIONS

This is a continuation application of PCT International Application No. PCT/JP2014/000908 filed on Feb. 21, 2014, designating the United States of America, which is based on and claims priority of Japanese Patent Application No. 2013-057613 filed on Mar. 21, 2013. The entire disclosures of the above-identified applications, including the specifications, drawings and claims are incorporated herein by reference in their entirety.

FIELD

The present disclosure relates to image processing methods and image processing devices that perform 3D display image processing based on a plurality of images.

BACKGROUND

Patent literature (PTL) 1 discloses a technique of storing, in a storage unit, image data for a plurality of images obtained by capturing the same scene from different perspectives, and based on changes in conditions related to the displaying or viewing of the images, appropriately selecting two pieces of image data from the storage unit and using the image data to perform 3D display image processing. This image processing is, for example, alignment adjustment such as parallax adjustment, or cropping. The selection of two pieces of image data is made such that the 3D image based on the two selected pieces of image data fulfills a prescribed condition (including, for example, a condition related to a parallactic angle that provides an effortless viewing experience and a condition related to spatial reproducibility). This provides an appropriate stereoscopic effect to the viewer.

CITATION LIST

Patent Literature

[PTL 1] WO2012/137454

SUMMARY

Technical Problem

The present disclosure provides an image processing method and an image processing device that, when images are appropriately selected from a plurality of images obtained by capturing a specified subject from different perspectives and displayed in 3D, perform image processing on the selected images to reduce variations in the display position of the specified subject and provide the viewer with a more effortless viewing experience than with conventional techniques.

Solution to Problem

The image processing method according to the present disclosure is for performing image processing on a first perspective image and a second perspective image. The first perspective image and the second perspective image form a 3D display image and are specified via selection from a group of images. The group of images is obtained by capturing a subject from at least three different perspectives. The image processing method includes performing adjustment processing on the first perspective image based on a prescribed reference position and a capturing position related to the first perspective image, the adjustment processing shifting a position of the subject in the first perspective image to a position in which the subject would appear if the capturing position related to the first perspective image were the prescribed reference position, and performing adjustment processing on the second perspective image based on the prescribed reference position and a capturing position related to the second perspective image, the adjustment processing shifting a position of the subject in the second perspective image to a position in which the subject would appear if the capturing position related to the second perspective image were the prescribed reference position.

Moreover, the image processing device according to the present disclosure includes a processor and memory, and performs image processing on a first perspective image and a second perspective image. The first perspective image and the second perspective image form a 3D display image and are specified via selection from a group of images. The group of images is obtained by capturing a subject from at least three different perspectives. As a result of the processor executing a control program stored in the memory, the image processing device performs: adjustment processing on the first perspective image based on a prescribed reference position and a capturing position related to the first perspective image, the adjustment processing shifting a position of the subject in the first perspective image to a position in which the subject would appear if the capturing position related to the first perspective image were the prescribed reference position; and adjustment processing on the second perspective image based on the prescribed reference position and a capturing position related to the second perspective image, the adjustment processing shifting a position of the subject in the second perspective image to a position in which the subject would appear if the capturing position related to the second perspective image were the prescribed reference position.

Advantageous Effects

With the image processing method and image processing device according to the present disclosure, when images are appropriately selected from a plurality of images obtained by capturing a specified subject from different perspectives and displayed in 3D, the display positions of the specified subject in the images are aligned at a reference position, which provides the viewer (user) with a more effortless viewing experience.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Figure 1:
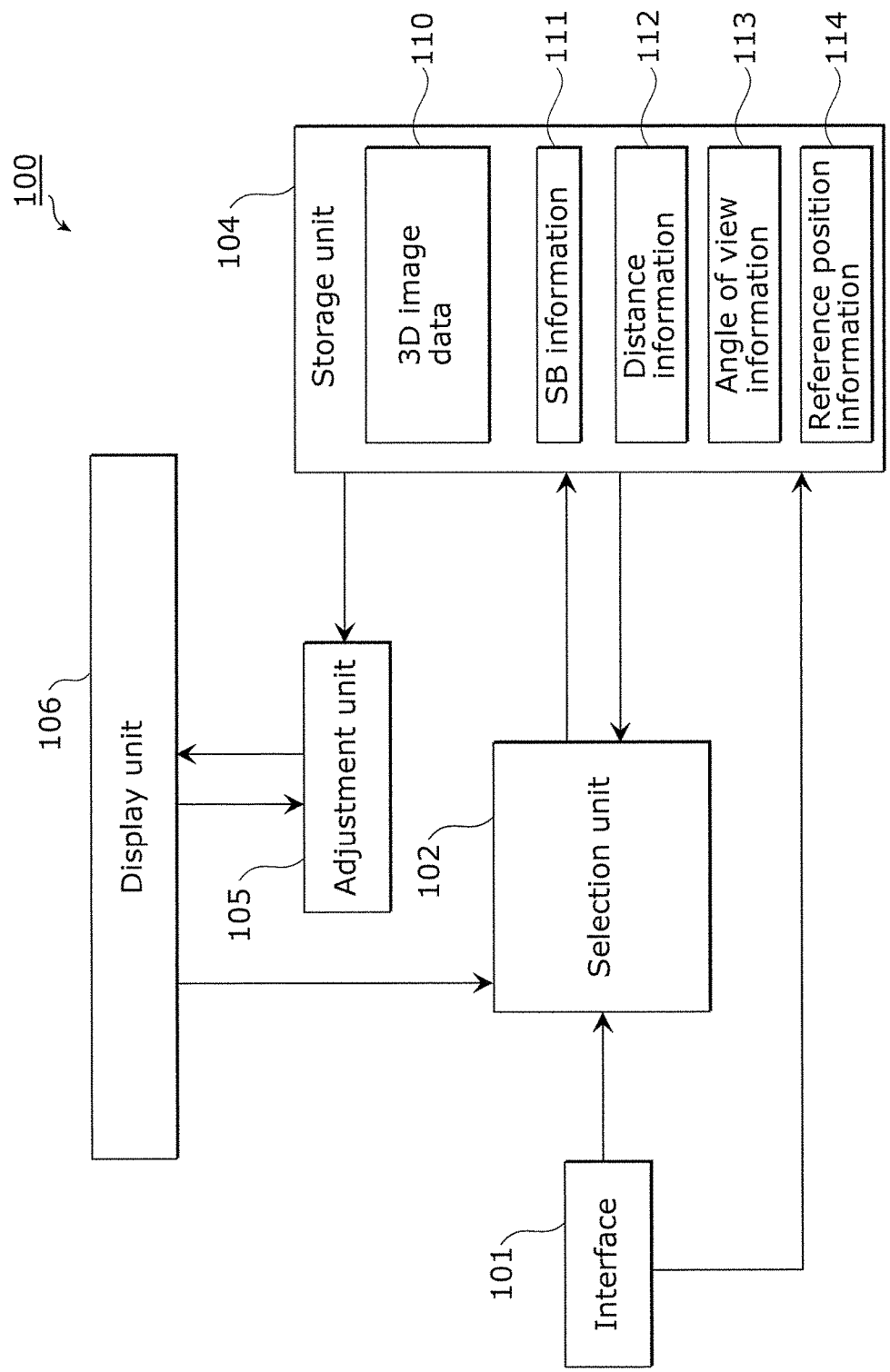
FIG. 1 is a block diagram illustrating a configuration of an image processing device according to Embodiment 1.

When images are appropriately selected from a plurality of images obtained by capturing a specified subject from different perspectives, in order to reduce variations in the display positions of the specified subject, the image processing method according to the present disclosure performs image processing on a first perspective image and a second perspective image. The first perspective image and the second perspective image form a 3D display image and are specified via selection from a group of images. The group of images is obtained by capturing a subject from at least three different perspectives. The image processing method includes performing adjustment processing on the first perspective image based on a prescribed reference position and a capturing position related to the first perspective image, the adjustment processing shifting a position of the subject in the first perspective image to a position in which the subject would appear if the capturing position related to the first perspective image were the prescribed reference position, and performing adjustment processing on the second perspective image based on the prescribed reference position and a capturing position related to the second perspective image, the adjustment processing shifting a position of the subject in the second perspective image to a position in which the subject would appear if the capturing position related to the second perspective image were the prescribed reference position.

With this, in any image captured from any capturing position, a specified subject can be aligned with the position in which the subject would appear if the capturing position were the reference position, and variation in the position of the specified subject can be eliminated regardless of which image is selected. For example, the horizontal position (position in a left and right direction) of the specified subject is the same in any 3D image formed as a result of selecting, as left and right eye images for 3D display, any two images among the group of images captured from various capturing positions. Thus, for example, even if a selection is made in accordance with a change in a viewing condition of a 3D image, such as a change in screen size, resulting in a change in the two images to be used to form the 3D image to be displayed the position of the subject in the 3D image does not vary, making viewing more effortless for the viewer (user). Note that the viewing condition is a condition related to the environment and situation of the viewing of the 3D display image by the viewer, and includes, for example, the screen size of the display on which images are displayed in 3D, the distance between the display and the user, the interocular distance of the user, and the enlargement rate (display magnification rate) of the image. Moreover, the two images specified as the first perspective image and the second perspective image forming a 3D display image are, for example, the two actual images selected from the group of images, or are two images obtained as a result of performing magnification processing of enlarging or shrinking the two images selected from the group of images.

Here, for example, the image processing method may include: a first selection step of making the selection in accordance with a viewing condition for the 3D display image; a first adjustment step of performing, on the first perspective image and the second perspective image specified via the selection made in the first selection step, the adjustment processing for the first perspective image and the adjustment processing for the second perspective image, respectively; if the viewing condition changes, a second selection step of making the selection in accordance with the changed viewing condition, under a certain condition; and a second adjustment step of performing the adjustment processing on at least one image among the first perspective image and the second perspective image specified via the selection made in the second selection step.

With this, since at least one of the two selected images may have changed due to a change in the viewing condition of the 3D display image, the position of the subject in the changed image can be aligned with a position in which the subject would appear if the image were captured from the reference position. This makes viewing more effortless for the user.

Moreover, for example, when the first perspective image and the second perspective image specified via the selection made in the second selection step include an image that is unchanged from before the selection made in the second selection step, the adjustment processing may be omitted for the unchanged image in the second adjustment step.

With this, when one image among the two images selected in accordance with a change in a viewing condition of the 3D display image is the same as before the change in the viewing condition, adjustment processing can be omitted, and processing efficiency can be increased.

Moreover, for example, the selections made in the first selection step and the second selection step may each be a selection of two images among the group of images, the specified first perspective image and the specified second perspective image subject to the adjustment processing performed in the first adjustment step may be two images obtained as a result of performing magnification processing on each of the two images resulting from the selection made in the first selection step, and the at least one image subject to the adjustment processing performed in the second adjustment step may be obtained as a result of performing magnification processing on at least one image among the two images resulting from the selection made in the second selection step.

With this, even when magnification processing (enlargement, shrinking, etc.) is performed on an image and the image is displayed in 3D, since the position of the subject in the magnification processed image can be aligned with a position in which the subject would appear if the image were captured from the reference position, viewing is more effortless for the viewer.

Moreover, for example, the image processing method may further include a determination step of determining a prescribed position between capturing positions of any two images among the group of images to be the prescribed reference position. The adjustment processing performed in the first adjustment step and the adjustment processing performed in the second adjustment step may be performed based on the prescribed reference position determined in the determination step.

With this, the reference position can be determined to be a prescribed position such as an average value of all capturing positions in the group of images or an average value of the two images having the outermost capturing positions among all of the images, thereby making it possible to inhibit, to a certain degree, loss of image information resulting from a shift in the image due to the adjustment processing.

Moreover, for example, the image processing method may further include, preceding the selection made in the first selection step, a storing step of storing, on a storage medium, the group of images and information indicating a capturing position of each image in the group of images. Among the group of images stored on the storage medium, a distance between the capturing positions of any given pair of images may be different from a distance between the capturing positions of any other given pair of images.

With this, the group of images can be efficiently stored on the storage medium for rapid and appropriate display in 3D in accordance with a change in a viewing condition of the 3D display image.

Moreover, for example, the image processing method may further include a display step of displaying the first perspective image and the second perspective image subjected to the adjustment processing.

With this, the position of the subject in the 3D image does not vary even when the 3D display image is displayed and there is a change in a viewing condition for viewing of the display and, as a result, a change is made in the two images forming the 3D image to be appropriately displayed in accordance with the changed viewing condition. This makes viewing more effortless for the user.

Moreover, for example, the selections made in the first selection step and the second selection step may each be a selection of two images among the group of images, the specified first perspective image and the specified second perspective image subject to the adjustment processing performed in the first adjustment step may be the two images resulting from the selection made in the first selection step, and the at least one image subject to the adjustment processing performed in the second adjustment step may be at least one image among the two images resulting from the selection made in the second selection step.

With this, even when magnification processing (enlargement, shrinking, etc.) is not performed on an image and the image is displayed in 3D, since the position of the subject in the magnification processed image can be aligned with a position in which the subject would appear if the image were captured from the reference position, viewing is more effortless for the viewer.

Moreover, for example, the adjustment processing performed on the first perspective image may shift the position of the subject in the first perspective image to a position in which the subject would appear if the first perspective image were captured from the prescribed reference position with a camera whose optical axis is parallel to an optical axis of a camera used to capture the first perspective image, and the adjustment processing performed on the second perspective image may shift the position of the subject in the second perspective image to a position in which the subject would appear if the second perspective image were captured from the prescribed reference position with a camera whose optical axis is parallel to an optical axis of a camera used to capture the second perspective image.

With this, for example, the horizontal position of subject is the same in any 3D image formed from any two images among the group of images to be used as left-eye images and right-eye images for 3D display, each of which is captured from a different capturing position while keeping the optical axis of the camera parallel. This makes viewing more effortless for the user. Moreover, adjustment processing can be performed without having to perform keystone correction to remove keystone image distortion, which is necessary when the optical axes of the cameras are not parallel.

Moreover, the image processing device according to the present disclosure includes a processor and memory, and performs image processing on a first perspective image and a second perspective image. The first perspective image and the second perspective image form a 3D display image and are specified via selection from a group of images. The group of images is obtained by capturing a subject from at least three different perspectives. As a result of the processor executing a control program stored in the memory, the image processing device performs: adjustment processing on the first perspective image based on a prescribed reference position and a capturing position related to the first perspective image, the adjustment processing shifting a position of the subject in the first perspective image to a position in which the subject would appear if the capturing position related to the first perspective image were the prescribed reference position; and adjustment processing on the second perspective image based on the prescribed reference position and a capturing position related to the second perspective image, the adjustment processing shifting a position of the subject in the second perspective image to a position in which the subject would appear if the capturing position related to the second perspective image were the prescribed reference position.

With this, no matter which capturing position the selected image is captured from, since image processing which positions the subject in a position in which the subject would appear if the image were captured from the reference position is performed, the user can effortlessly view the 3D display.

Note that each general and specific aspect includes one or a combination of, for example, a device, system, method, integrated circuit, computer program, computer-readable storage medium.

Hereinafter, a non-limiting embodiment will be described in detail with reference to the drawings where necessary. Note, however, that detailed descriptions may be omitted where unnecessary. For example, detailed descriptions of well-known aspects or repetitive descriptions of essentially similar configurations may be omitted. This is to avoid redundancy and make the following description easier for those skilled in the art to understand.

Note that the inventors provide the accompanying drawings and the following description not to limit the scope of the claims, but to aid those skilled in the art to adequately understand the present disclosure. In other words, the numerical values, shapes, materials, elements, the arrangement and connection of the elements, steps (processes), the processing order of the steps etc. shown in the following specific example are mere examples, and therefore do not limit the present disclosure, the scope of which is defined by the claims. As such, elements in the following embodiment not recited in any one of the independent claims are elements that are arbitrarily included. Moreover, the drawings are schematic drawings, and are not necessarily exact depictions.

Embodiment 1

In Embodiment 1, an image processing device 100 is provided as one example which implements an image processing method that, when selecting images from a plurality of images in which a specified subject (for example, a person) is captured from different perspectives and displaying them in 3D, reduce variations in the display position of the subject.

Hereinafter, Embodiment 1 will be described with reference to FIG. 1 through FIG. 11.

1-1. Configuration

FIG. 1 is a block diagram illustrating the configuration of the image processing device 100 according to Embodiment 1.

In terms of hardware elements, the image processing device 100 includes a display device and a computer including, for example, memory (main storage device), a hard disk device, etc. (auxiliary storage device), a processor, an input device, and a communications interface. In terms of functional elements, the image processing device 100 includes an interface 101, a selection unit 102, a storage unit 104, an adjustment unit 105, and a display unit 106. The memory is, for example, ROM or RAM. The memory is stored in advance with, for example, a control program for implementing the processes of each functional unit or a parameter to be used by the control program. The memory is also used to temporarily store each parameter used when the control program is executed by the processor.

Hereinafter, each functional element will be described in detail.

The interface 101 includes a function of receiving an input from a user, and includes, as an input interface for the image processing device 100, an input device such as a keyboard, mouse, switch, or touch panel. When the input device is a touch panel, the touch panel may be provided on the surface of the display device (the display unit 106). Received inputs include, for example, a viewing condition related to the viewing of the 3D display image by the user. Note that a viewing condition is information including the screen size (window size is also acceptable) of the display unit 106, the viewing distance, which is the distance between the display and the user, and the interocular distance of the user, and also includes display conditions. A display condition is information including, for example, a display magnification rate (enlargement rate) indicating the degree to which magnification processing, which enlarges or shrinks the 3D display image upon displaying the 3D display image on the display unit 106, is applied. This display magnification rate (enlargement rate) may be based on the display size (screen size) of the display unit 106 (i.e., the degree to which the 1.0× native size is increased or reduced), and may be based on a window size of a window displayed in the display (i.e., the degree to which the 1.0× native size of the window is increased or reduced). Note that when the display of the display unit 106 is implemented in 3D glasses (i.e., a head mounted display), the viewing condition may include the size of the 3D glasses. A virtual screen size (how large the screen appears to the user) may be inputted as the screen size, and a virtual viewing distance (how far away the screen appears to the user) may be inputted as the viewing distance. Note that information inputted via the interface 101 is transmitted to the selection unit 102 and stored in the storage unit 104.

The selection unit 102 includes a function of selecting two images from a group of images stored in the storage unit 104 to be used as base images for the 3D display image to be displayed on the display unit 106. The selection is based on information obtained from the interface 101, the display unit 106, and the storage unit 104. This function is implemented by the processor executing the control program stored in the memory. The selection method of the two images will be described later. Note that the selection unit 102 may obtain the actual information indicating the viewing condition itself from the interface 101. Moreover, the selection unit 102 may obtain, from the interface 101, information required to specify the viewing condition including the display condition, such as the display magnification rate, and specify the viewing condition based on information in the storage unit 104.

The storage unit 104 is, for example, memory, and includes a function of storing a plurality of images (3D image data 110) obtained by capturing the same subject from a plurality of perspectives, and information related to the 3D image data 110 (for example, information related to a capturing condition). The storage unit 104 moreover includes a function of storing information indicating a preset display magnification rate and information received from the user via the interface 101. The storage unit 104 may be a storage medium other than memory, such as a hard disk, CD, DVD, BD, SD card, or an external storage provided over a network (Internet, intranet). Note that two images may be selected from the plurality of images included in the 3D image data 110 stored in the storage unit 104 and reproduced by the display unit 106 to display a 3D image to the user. This is application of a known technique in which a 3D image is displayed to a user by capturing left and right videos (images) so as to have binocular disparity and displaying the captured left and right videos (images) on a display device capable of individual left and right eye projection. The plurality of images obtained by capturing the same subject from different perspectives which constitute the 3D image data 110 are not necessarily required to have the same capturing time, angle of view, or recording pixels, etc. Note that the imaging element (image sensor) of the camera that captures these images may be a camera that can sense visible light with a high degree of sensitivity, and may be a camera that can sense any given wavelength domain such as infrared light or X ray light.

Information related to the 3D image data 110 stored in the storage unit 104 includes, for example, reference position information 114, as well as SB information 111, distance information 112, and angle of view information 113, which are information related to capturing conditions.

The reference position information 114 is information indicating a reference position that acts as a depiction reference related to the capturing position (perspective position) of each image obtained by capturing the same subject from different perspectives, which collectively constitute the 3D image data 110. For example, the capturing position of any given specified image in the 3D image data 110, an average position of the capturing positions of the images, or a central position within the range of the capturing positions of the images or a specific position within the range is set in advance as the reference position. Determining the reference position to be a prescribed position between capturing positions of any two images among the images constituting the 3D image data 110, for example, is effective particularly from the perspective of reducing loss of image information from alignment adjustment (image shifting), which will be described later. Note that this position between capturing positions of any two images includes, for example, the average capturing position of all of the images, and the average capturing position of the two images having the outermost capturing positions among all of the images. Moreover, the capturing position is, more specifically, the focal point in the camera.

The SB information 111 is information related to the stereo base (SB) between the capturing positions of each image constituting the 3D image data 110. In the SB information 111, the capturing position of each image is expressed as distance from a point origin. When sequentially changing the capturing position by moving the camera, the point of origin is, for example, the first capturing position. More specifically, the SB information 111 is expressed as a difference between the focal point in the camera and the point of origin. The capturing position (for example, the focal point in the camera) may be obtained based on the global positioning system (GPS), may be calculated by analyzing the images captured from each position, and may be obtained by some other method. Moreover, the capturing position is not required to be the exact focal point in the camera; the capturing position may be, for example, the general location of the camera.

Figure 2:
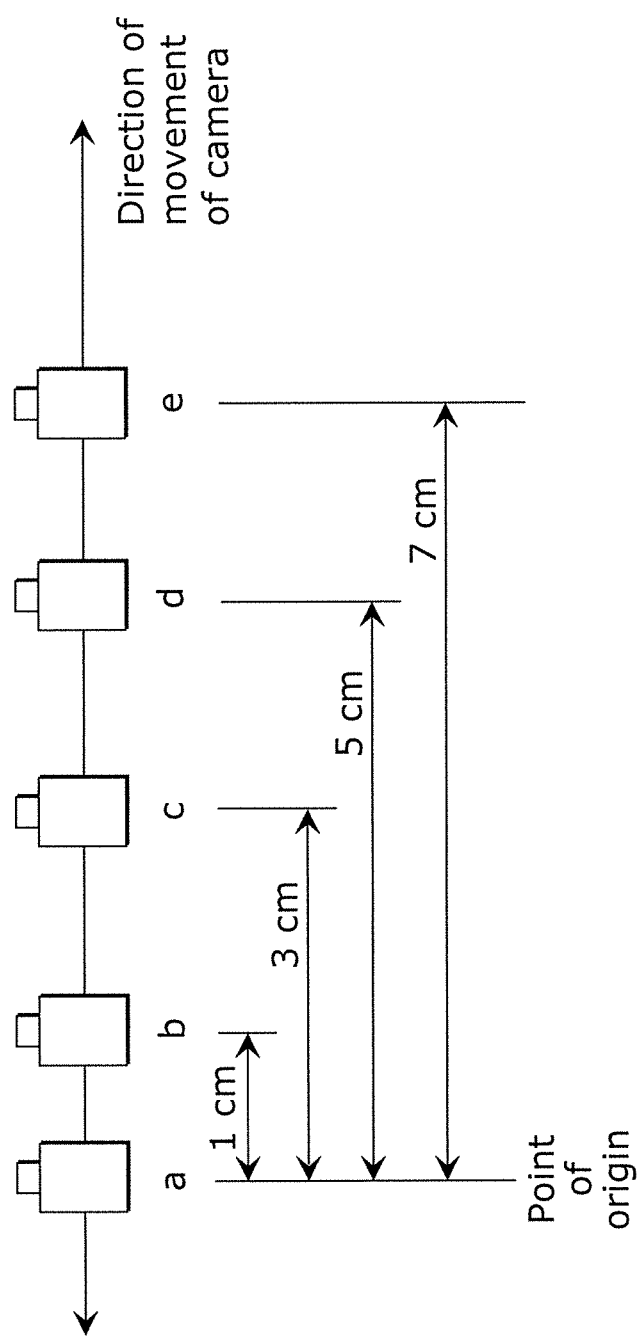
FIG. 2 illustrates SB information according to Embodiment 1.

FIG. 2 illustrates the SB information 111. FIG. 2 illustrates examples of capturing positions when the same subject is captured from a plurality of perspectives.

As illustrated in FIG. 2, the point of origin is position a, and the SB information 111 for the image captured at position a is 0 cm. Similarly, the SB information 111 for the image captured at position b is 1 cm, and the SB information 111 for the image captured at position c is 3 cm. When, for example, the image captured at position a and the image captured at position b are selected as the two perspective images to be used to form the 3D display image, the SB between the two images is 1 cm (i.e., the difference in SB information is calculated by subtracting 0 cm from 1 cm). Moreover, when the image captured at position b and the image captured at position c are selected, the SB between the two images is 2 cm (i.e., the difference in SB information is calculated by subtracting 1 cm from 3 cm).

The distance information 112 is information related to the distance to the subject captured in each image collectively constituting the 3D image data 110. Note that the distance to the subject is, more specifically, the distance from the focal point in the camera, and may be the distance from the perspective point (position) from which each image is captured, as the position of the camera, and alternatively may be the distance from the reference position. Note that a value measured by a distance sensor placed next to the camera may be used as the distance to the subject, and a value obtained by a matching technique such as stereo matching using a plurality of images may be used. Moreover, information that indicates two distances—the nearest distance and the furthest distance—as the distance to the subject may be used as the distance information 112, and the information may include a distance other than the nearest distance and the furthest distance. Moreover, the nearest distance and the furthest distance may be made to be the same value.

The angle of view information 113 is information related to the angle of view of the camera upon capturing each image collectively constituting the 3D image data 110. The angle of view information 113 is, for example, expressed as focal distance of the lens of the camera and the sensor size of the imaging element (image sensor). For example, for a camera having a full-sized 25 mm sensor, the angle of view information 113 is expressed as the focal length of the lens or the angle of view (angle) of the lens only. Note that when a lens that produces no distortion is used, the angle of view is determined by the focal distance of the lens and the sensor size.

The 3D image data 110, SB information 111, distance information 112, angle of view information 113, and reference position information 114 stored in the storage unit 104 are not limited to any particular format, and may be, for example, registered in a database and used by searching, or stored as files managed in a file system. The images constituting the 3D image data 110 may be stored in a video format such as MPEG. Moreover, the images may be stored using an image format such as multi-picture format (MPF).

Figure 3:
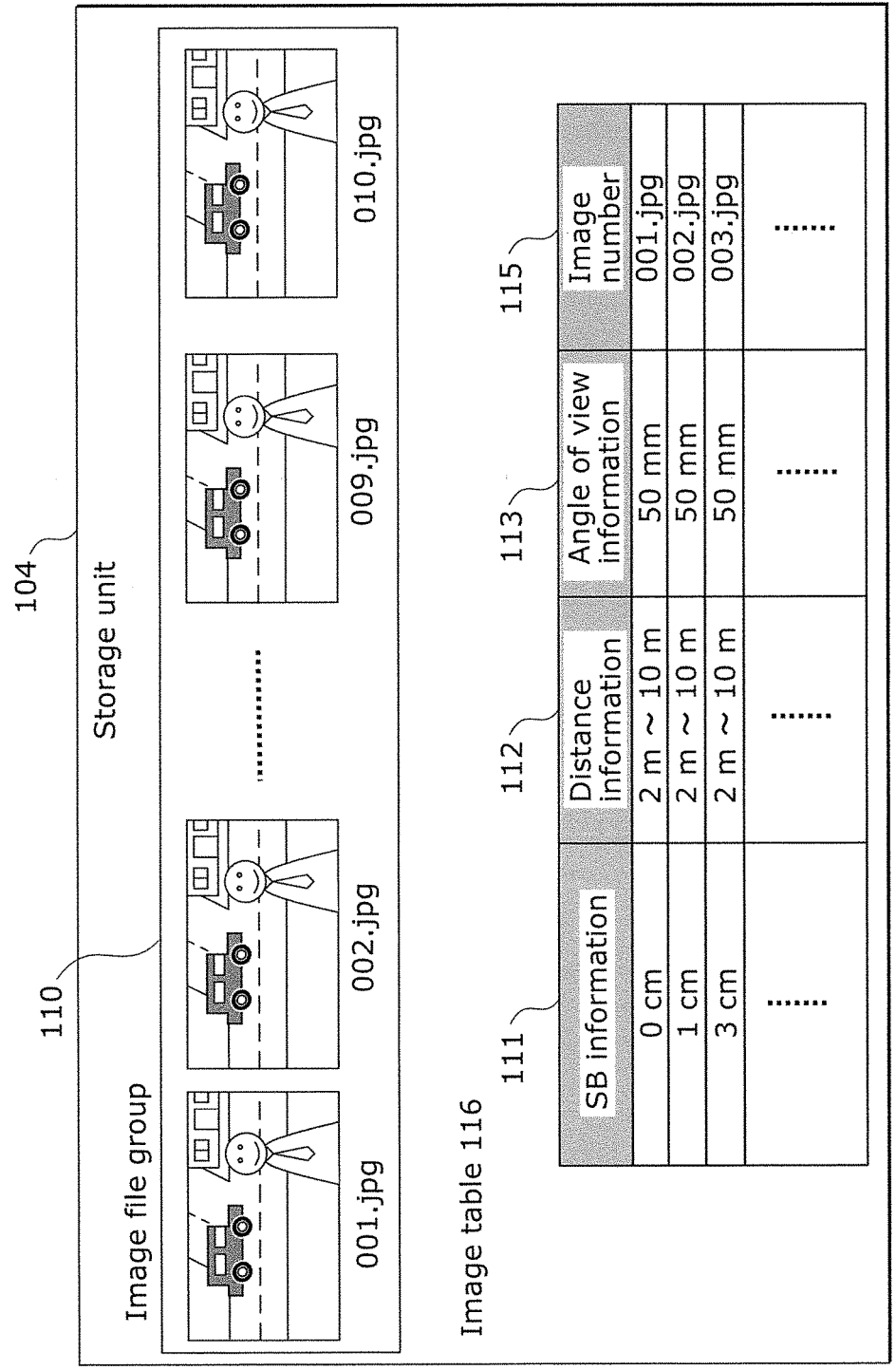
FIG. 3 illustrates an example of information stored in a storage unit and how the information is organized.

FIG. 3 illustrates a specific example of how information stored in the storage unit 104 is organized.

In FIG. 3, the group of images constituting the 3D image data 110 includes 10 images saved as JPEG image files (i.e., have a jpg file extension). The group of 10 images is a group of images of the same scene (i.e., 10 images obtained by capturing the same subject from different perspectives). Each 3D display image (stereoscopic image) formed by pairing two different images in the group of images has a different inter-camera distance (SB). For this reason, the selection unit 102 is able to select a pair of images among a plurality of pairs of images having different inter-camera distances, by selecting two images (one pair of images). The image table 116 is a table that associates the SB information 111, distance information 112, and angle of view information 113, which are information related to the 3D image data 110, with image numbers 115 associated with the 3D image data 110. When the file names of the 10 images constituting the 3D image data 110 are numbered 001 through 010, for example, the image numbers 115 are expressed as the file names. Note that in the example illustrated in FIG. 3 the SB information 111 of 0 cm associated with the JPEG image file 001.jpg indicates that the capturing position of this image file is the point of origin. Moreover, the distance information 112 of 2 meters to 10 meters associated with the JPEG image file 001.jpg indicates that, for example, the nearest subject in the image is positioned 2 meters from the camera, and the furthest subject in the image is positioned 10 meters from the camera.

The adjustment unit 105 includes a function of outputting, to the display unit 106, two images resulting from performing image processing (adjustment processing) on two images selected by the selection unit 102 from among the group of images stored in the storage unit 104. This function is implemented by the processor executing the control program stored in the memory. Note that the details regarding the image processing (adjustment processing) performed by the adjustment unit 105 will be described later.

The display unit 106 is implemented as the display device and includes a function of displaying the 3D display image. Any display format that allows for 3D display, including a glasses display format that requires 3D glasses and a naked eye display format that does not require 3D glasses, for example, is acceptable. For example, a frame sequence display that requires active shutter 3D glasses may be used, and a display with a dual view parallax barrier may be used. Moreover, the display unit 106 includes a function of transmitting information related to the display to the selection unit 102 and the adjustment unit 105 over, for example, high-definition multimedia interface (HDMI; registered trademark). Information related to the display is, for example, information on the screen size of the display, information on a window size, or information on the 3D glasses. This information is included in the viewing condition. Note that when the display unit 106 is, for example, a personal computer (PC) including a 3D display function, changes in window size by the user may be frequent, so the display unit 106 transmits information related to the display to the selection unit 102 and the adjustment unit 105 each time there is a change. Note that in a configuration in which the display unit 106 is not capable of transmitting the information related to the display to the selection unit 102 and the adjustment unit 105, the information related to the display may be input via the interface 101. Moreover, the information related to the display may be a predetermined fixed value.

1-2. Operation

Here, operations performed by the above-described image processing device 100 will be described.

1-2-1. Overall Operation

Figure 4:
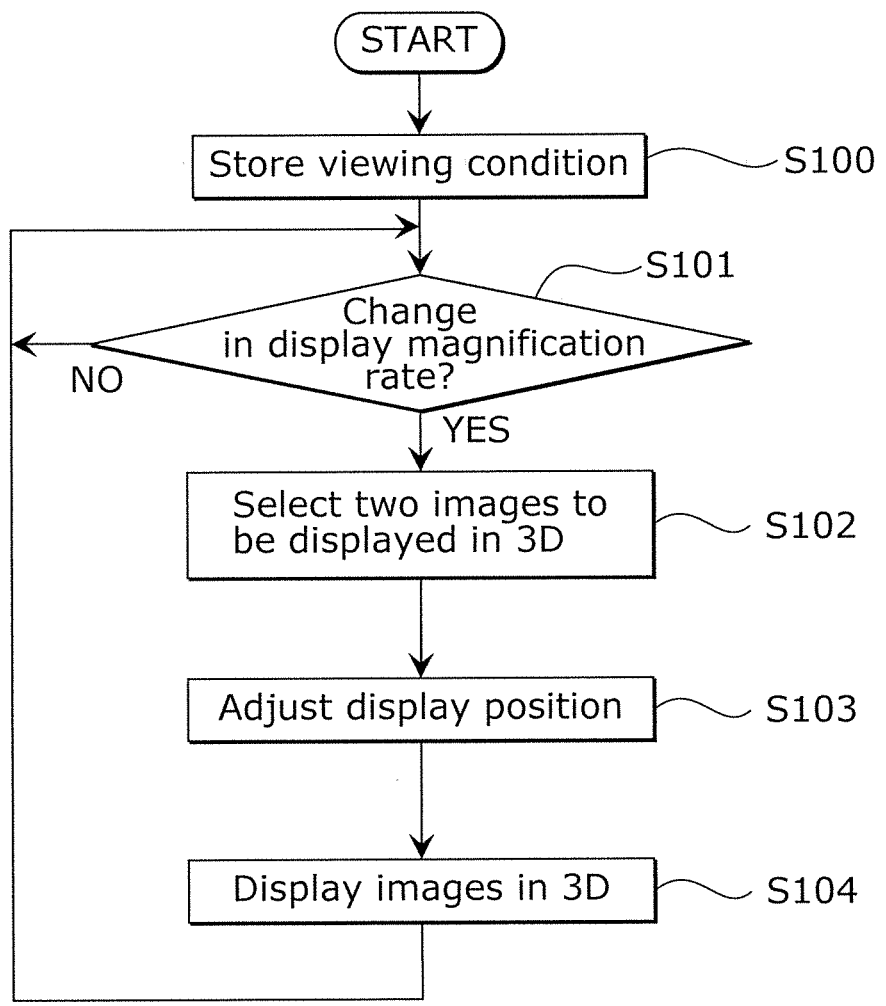
FIG. 4 is a flow chart illustrating operations performed by an image processing device according to Embodiment 1.

FIG. 4 is a flow chart illustrating operations performed by the image processing device 100. Broadly speaking, FIG. 4 illustrates processing performed when a user changes the display magnification rate (inputs a display magnification rate), to perform image processing (adjustment processing) on a pair of images selected from the group of images captured from a plurality of perspectives and constituting the 3D image data and display the 3D image. Information related to the 3D image data 110 and the capturing condition, etc., is stored in the storage unit 104, and when the flow of processes in FIG. 4 is started while an image is being displayed by the display unit 106, an image whose display magnification rate has been changed (an image which has been enlarged or shrunk) is newly displayed.

The interface 101 of the image processing device 100 receives, from the user, inputs of viewing conditions such as a screen size W0 of the display, a viewing distance L, and an interocular distance S, and stores information indicating the input viewing conditions in the storage unit 104 (process step S100).

Next, the selection unit 102 of the image processing device 100 checks whether an input indicating a change to the display magnification rate as a display condition has been made from the interface 101, and while no input related to a change in display magnification rate is detected, the selection unit 102 is in standby until a detection is made (process step S101).

Figure 5:
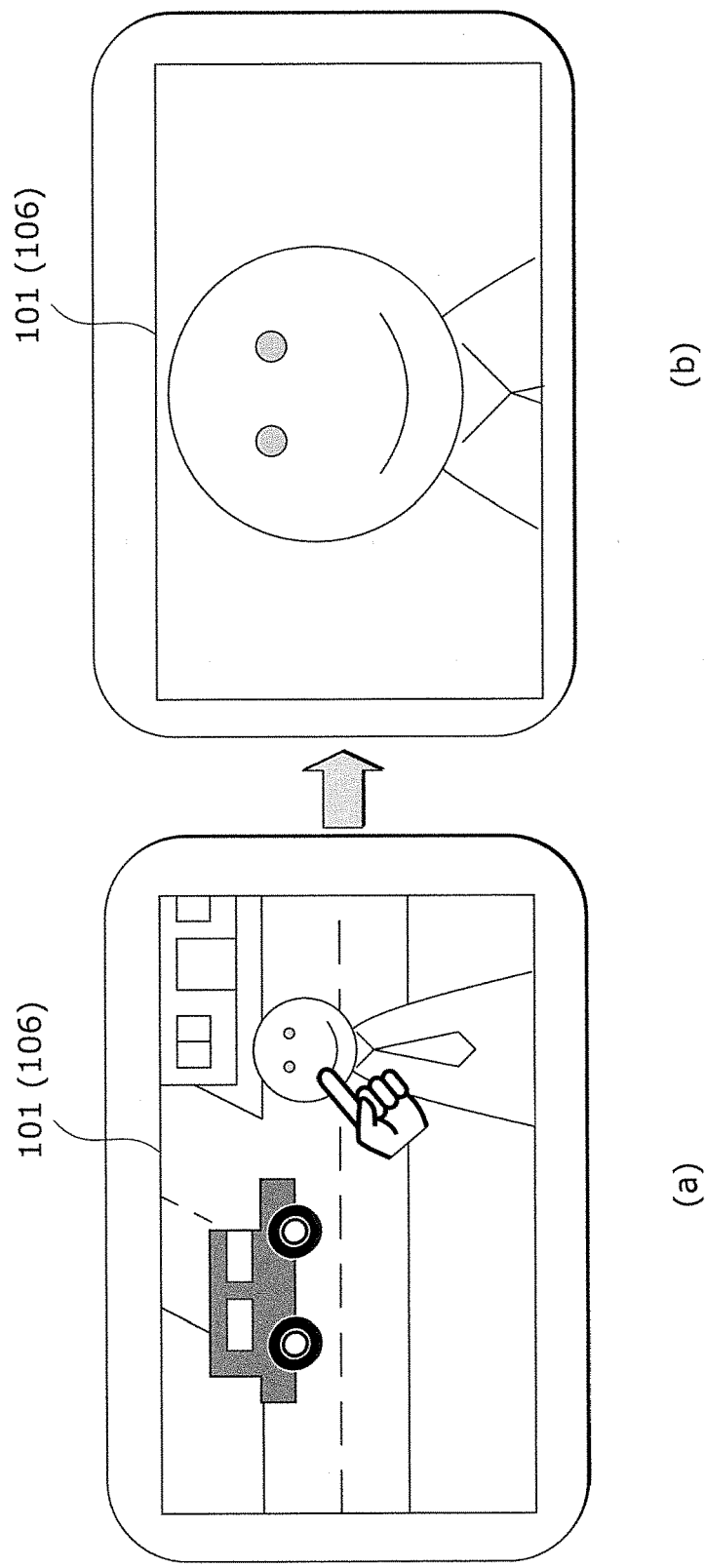
FIG. 5 illustrates how it would appear if an input indicating a change to the display magnification rate were made using an interface according to Embodiment 1.

FIG. 5 illustrates how it would appear if an input indicating a change to the display magnification rate were made using the interface 101. FIG. 5 illustrates an example in which the interface 101 is implemented as a transparent touch panel provided on the face of the display (screen) of the display unit 106. In this case, the interface 101 receives an input from the user made by the user touching the touch panel. As illustrated in (a) in FIG. 5, when the user touches the screen of the display unit 106 (i.e., the touch panel, which is the interface 101), the interface 101 transmits information corresponding to that touch input to the selection unit 102. The selection unit 102 specifies a display magnification rate corresponding to information transmitted from the interface 101 by, for example, referencing the storage unit 104 (information for specifying a display magnification rate is stored in advance in correspondence with the touch input). Note that other than a display magnification rate which indicates enlargement or shrinking, a central position (coordinates) about which the image is to be enlarged or shrunk may be input. For example, as illustrated in (a) in FIG. 5, the user touches the face of the person in the image with his or her finger, whereby the image is enlarged by a rate of 2.0×, centralized about the face of the person, as illustrated in the example in (b).

In process step S101, when the display magnification rate is input via the interface 101, the selection unit 102 selects two images to be displayed in 3D (process step S102). The selection of two images from the group of images captured at various perspectives is equivalent to a selection of a pair of images from a plurality of pairs of images having different stereo bases (baselines) related to the capturing. When the environment in which the user is viewing the 3D display (viewing conditions including display conditions) changes, the pair of images to be displayed in 3D that can be effortlessly viewed by the user changes.

More specifically, based on the viewing conditions of display (screen) size W0 of the display unit 106, and viewing distance L, interocular distance S, as well as the capturing conditions stored in the storage unit 104, the selection unit 102 selects two images that can be effortlessly viewed (in stereovision) when displayed in 3D. For example, the selection unit 102 calculates, based on various conditions (i.e., viewing conditions and capturing conditions), an angle of view for each 3D image formable from every possible pair of images among the group of images captured from a plurality of perspectives, and selects two images whose greatest parallactic angle and smallest parallactic angle are within a range of −1° to 1°. This is because, generally speaking, it is known that a parallactic angle within 1° of pop-out and −1° of recession in terms of 3D display depth allows a viewer to comfortably recognize the subject as a 3D object. Note that even if the viewing distance L is not input via the interface 101, the viewing distance L may be stored as a predetermined fixed value in the storage unit 104 in advance. Alternatively, the viewing distance L may be calculated (estimated) based on the screen size of the display unit 106. For example, the viewing distance L can be estimated to be a value three times the screen height. Moreover, even if the interocular distance S is not input via the interface 101, an interocular distance S of 6.5 cm, which is the average human interocular distance, may be used. Alternatively, the interocular distance S may be calculated (estimated) based on information based on the 3D glasses used.

Note that other than the method of selecting images which allow for effortless 3D viewing (in stereovision), the selection unit 102 may used a different method to select the two images to be used for 3D display. In other words, any method for selecting two images to be used for 3D display that does not result in 3D display of two wrong images (for example, 3D display where display of the right-eye image and the left-eye image is reversed) may be used. For example, in order to select two images that will provide an effortless viewing experience when viewed in stereovision as well as provide a strong 3D effect, among 3D each images formed from two images having a parallactic angle within 1° of pop-out and −1° of recession in terms of 3D display depth, the 3D image formed from two images having the greatest parallactic angle may be selected. Moreover, two images exhibiting a high degree of spatial reproducibility (reproducibility of pop-out and recession distance) in 3D display may be selected. Note that spatial reproducibility is an index indicating the relationship between actual distance to the subject at the time of capturing and apparent distance to the subject when displayed in 3D. 3D display having a high degree of spatial reproducibility is display that closely reproduces the feeling of viewing the actual space captured for the viewer (user), and also tends not to cause the user discomfort. Moreover, regarding the method of selection of the two images, two images having an angle of view after alignment adjusting (image shift), such as parallax adjustment, by the adjustment unit 105 that is within 1° of pop-out and −1° of recession may be selected.

Note that even if a viewing condition changes, when two images that have already been selected meet a prescribed determination condition, such as a condition in which the greatest parallactic angle and smallest parallactic angle of the two images are within a range of −1° to 1° (condition corresponding to the above described selection method), processing may return to process step S101 without performing reselection.

After two images have been selected by the selection unit 102 for 3D display, the adjustment unit 105 performs image processing related to adjustment of the display position of the subject on the two selected images (process step S103). Details regarding the image processing (adjustment processing) performed by the adjustment unit 105 will be described later.

After the adjustment unit 105 has performed image processing (adjustment processing) on the two images, the display unit 106 displays the two adjusted images in 3D (process step S104). Afterward, the processing returns to the process step S101.

1-2-1. Details Regarding Operations Performed by Adjustment Unit 105

Figure 6:
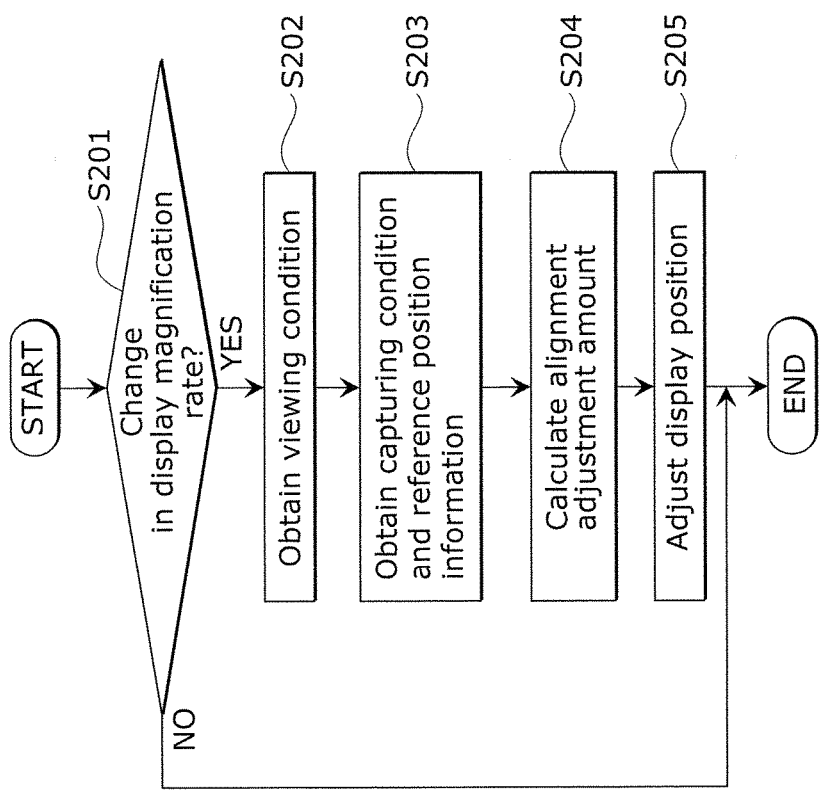
FIG. 6 is a flow chart illustrating operations performed by an adjustment unit according to Embodiment 1.

FIG. 6 is a flow chart illustrating operations performed by the adjustment unit.

First, the adjustment unit 105 checks whether the two images selected by the selection unit 102 are different from the two images currently selected or not—that is to say, checks whether the selected images have changed or not—(process step S201). When the selected images have not changed, the alignment processing, etc., is skipped.

When either one of the selected images has changed, the adjustment unit 105 obtains a viewing condition (including a display condition) (process step S202). More specifically, the adjustment unit 105 obtains the display magnification rate and the screen size W0 of the display from the storage unit 104, the display unit 106, or the selection unit 102.

Next, the adjustment unit 105 obtains reference position information and information related to the capturing condition of the two images selected by the selection unit 102 (process step S203). More specifically, the adjustment unit 105 obtains, from the storage unit 104, reference position information 114, SB information 111 (inter-camera distance SB), and distance information 112 (distance R), angle of view information 113 (camera focal distance f, imaging element sensor size pw). Note that the reference position information 114 and the information related to the capturing condition may be inputted by the user, and the adjustment unit 105 may obtained these from the interface 101 rather than the storage unit 104.

The adjustment unit 105 then calculates, based on information obtained in process step S202 and S203, an alignment adjustment amount for the two images selected by the selection unit 102 in order to form a 3D image having a depth (pop-out amount) that allows for effortless viewing (process step S204). The calculation method for the alignment adjustment amount will be described in detail later.

After the alignment adjustment amount is calculated, the adjustment unit 105 performs image processing (alignment adjustment, etc.) on the two images selected by the selection unit 102, and the resulting images are outputted to the display unit 106 (process step S205). More specifically, the image processing by the adjustment unit 105 includes enlarging or shrinking the images to achieve a prescribed display magnification rate (see FIG. 4 and process step S101), and performing alignment adjustment (image shift). Note that when enlarging or shrinking the images, when an input of the central position (coordinates) about which the enlargement or shrinking is to be performed is received, each image is cropped such that the central position of the enlargement or shrinking becomes the center of the image.

Figure 7:
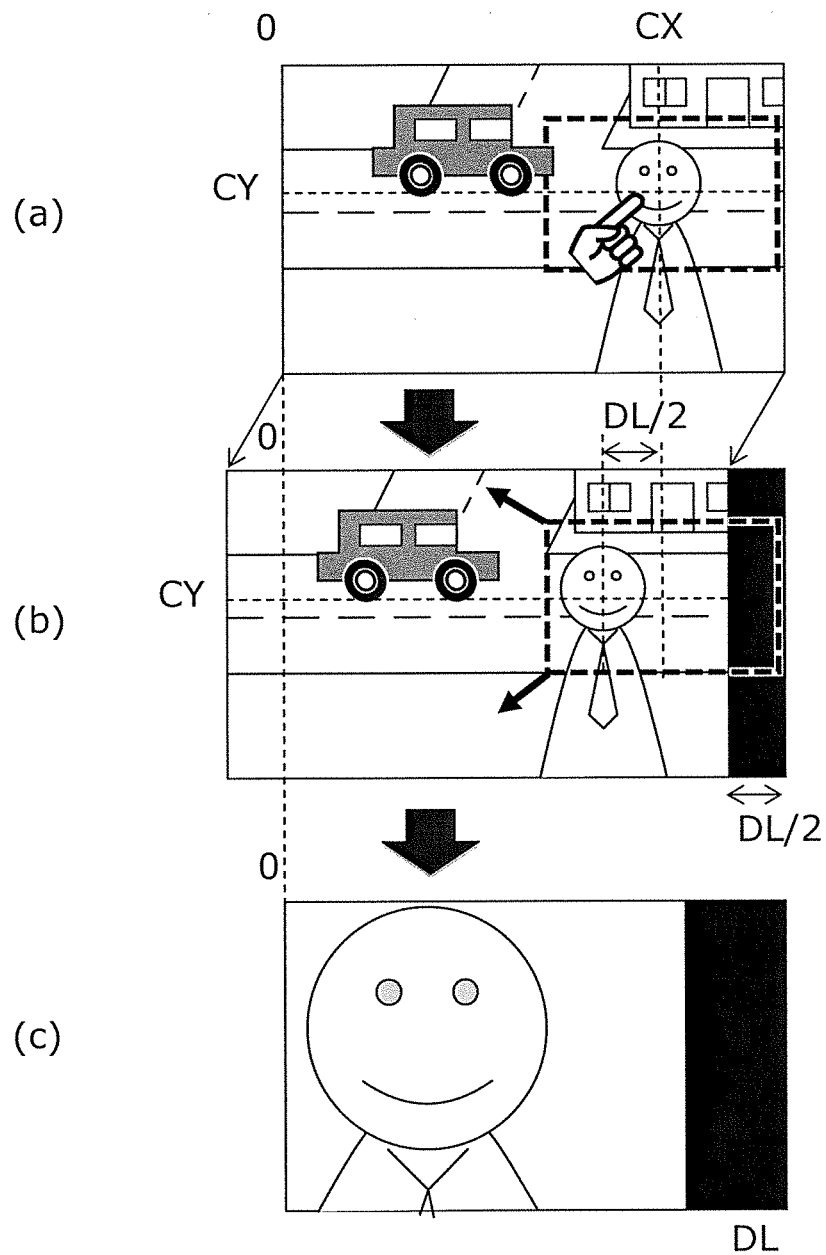
FIG. 7 illustrates image processing (adjustment processing) performed by an adjustment unit according to Embodiment 1.

FIG. 7 illustrates the image processing (adjustment processing) performed by the adjustment unit 105.

As illustrated in (a) in FIG. 7, when the user touches the screen of the display unit 106 (i.e., the touch panel of the display unit 106), a prescribed enlargement operation is performed. In this example, we will assume that the enlargement rate is fixed at 2.0×. The two dimensional XY coordinates (CX, CY) of the position touched is obtained via the interface 101. The adjustment unit 105 obtains the touch position (CX, CY), the display magnification rate of 2.0×, and the cropping size (half the size of the image). The touch position (CX, CY) will become the center of the enlarged image. Note that although the touch position will become the center of the enlarged image in this example, the center of the image before or after enlargement may be maintained.

As illustrated in (b) in FIG. 7, the adjustment unit 105 shifts the image (image data) by half the alignment adjustment amount DL calculated in process step S204, and crops the image centered about (CX−DL/2, CY) obtained by subtracting half of DL from CX. The image is cropped so as to obtained an image of half the image size (i.e., an image having ¼ the surface area). Then, the image obtained by enlarging the cropped image by a display magnification rate of 2.0× (2.0× height and width) (i.e., the image resulting from the image processing) is the image illustrated in (c) in FIG. 7. Note that, as illustrated in (c) in FIG. 7, the image resulting from the image processing is an enlarged image including a black area (area in which the image data value is zero, for example) resulting from the alignment adjustment (image shift) of the alignment adjustment amount DL. Note that although the alignment adjustment is exemplified as an image shift in a horizontal direction (X axis direction), the alignment adjustment may also include an image shift in a vertical direction (Y axis direction) in order to adjust a vertical misalignment between the right and left images forming the 3D image.

The adjustment unit 105 may also perform additional image processing other than alignment adjustment, cropping, and enlargement or shrinking. For example, information related to capturing such as an amount of misalignment of yaw angle, roll angle, pitch angle, or the horizon may be stored in the storage unit 104, and using this information, the adjustment unit 105 may perform various adjustments to accurately reproduce, in the 3D display, the subject captured by the adjustment unit 105. Moreover, in the example above, the touch position is used as the center about which the enlargement (or shrinking) of the image is performed, but the center about which the enlargement or shrinking is performed may be, for example, a region indicating a fixed value or a value saved at the time of capturing, and, alternatively, may be calculated based on the position of the specified subject in the image. Moreover, the center of the image after enlargement or shrinking, for example, may be calculated with some operation using the touch position.

1-2-3. Calculation of Alignment Adjustment Amount by the Adjustment Unit 105

Hereinafter, the calculation of the alignment adjustment amount by the adjustment unit 105 (process step S204) will be described in detail.

For illustrative purposes, first an alignment adjustment amount calculation method for a parallel twin lens camera having parallel optical axes is described, and then an alignment adjustment amount calculation method performed in the image processing device 100 by the adjustment unit 105 in which two images are selected from a group of images obtained by capturing the same subject from at least three perspectives will be described.

Figure 8:
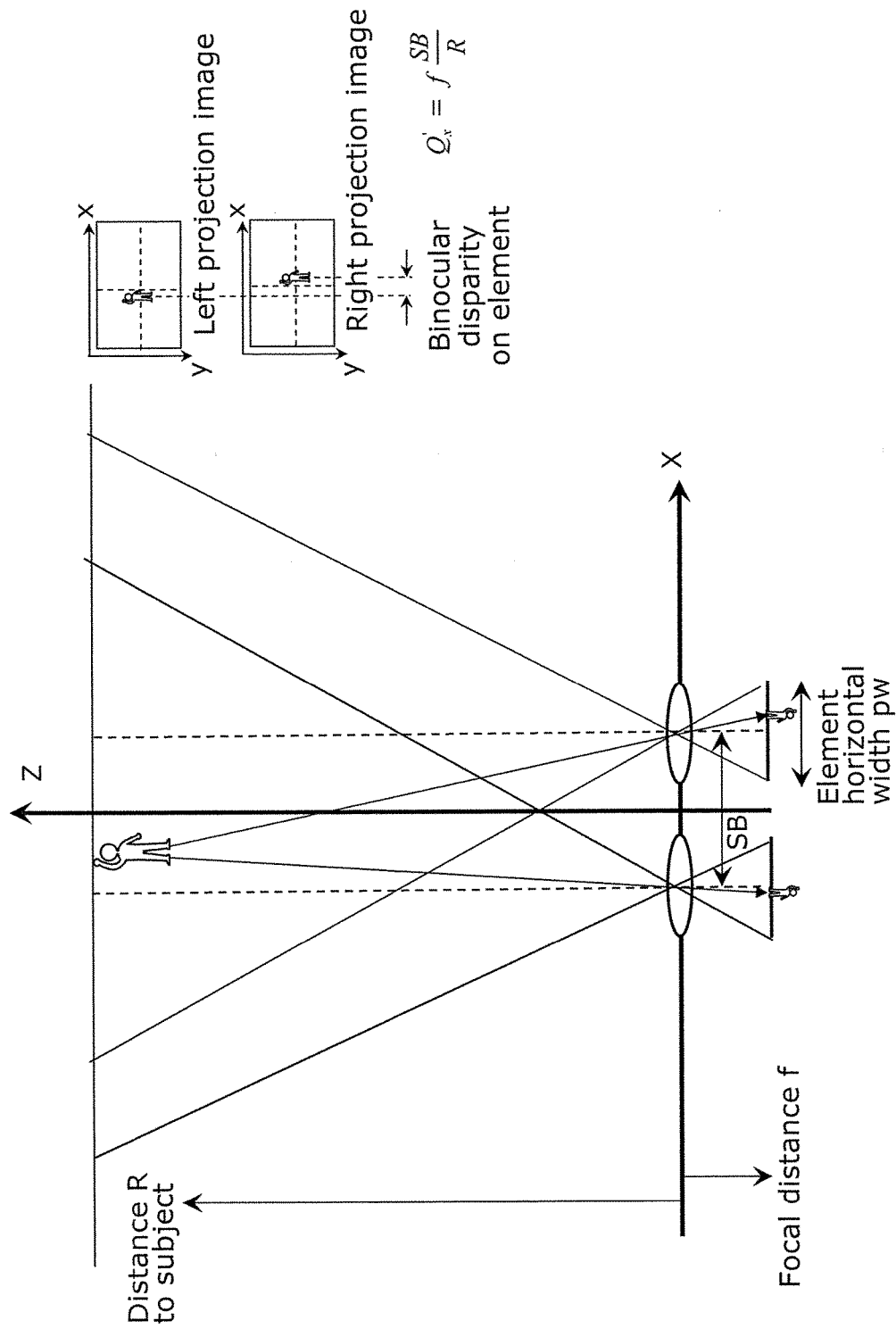
FIG. 8 illustrates binocular disparity resulting when a parallel twin lens camera is used.

FIG. 8 illustrates binocular disparity resulting when a parallel twin lens camera is used. As illustrated in FIG. 8, when a parallel twin lens camera is used (i.e., when two cameras are used), if the distance R to the subject, the focal distance f of the camera, and the inter-camera distance SB are known, the amount of binocular disparity Q'x at the time of capturing can be calculated with the following equation.

$$Q'x = f \times SB/R \qquad \text{(Equation 1)}$$

Figure 9:
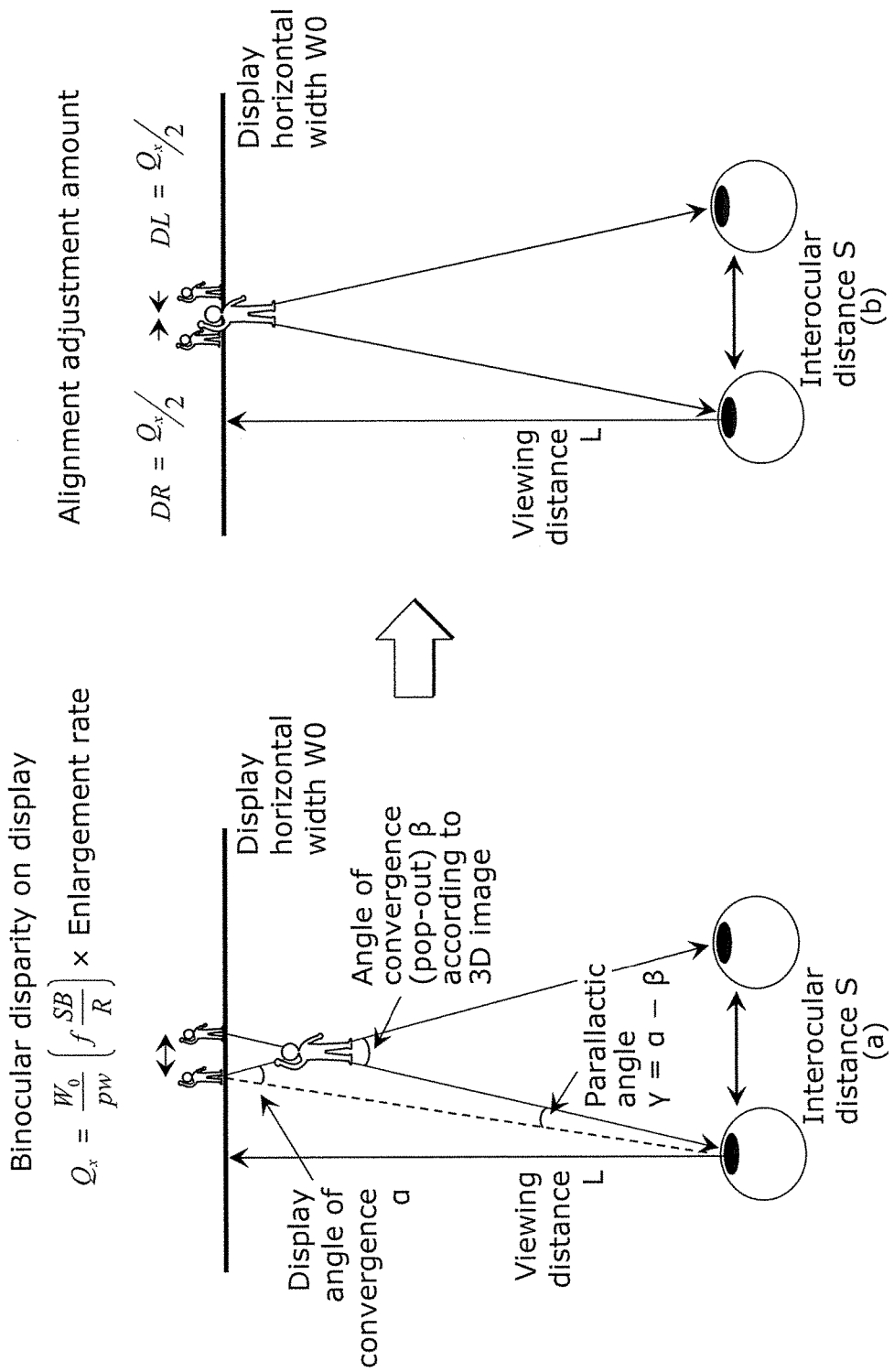
FIG. 9 illustrates alignment adjustment for an image captured with a parallel twin lens camera.

FIG. 9 illustrates alignment adjustment for an image captured with a parallel twin lens camera. (a) In FIG. 9 illustrates the relationship between the amount of binocular disparity calculated in FIG. 8 (with Equation 1) and the parallactic angle when the image is displayed on the display (when the image is viewed). The amount of binocular disparity in FIG. 8 is the amount of binocular disparity in the imaging element. As such, it is necessary to convert Q'x to the amount of binocular disparity Qx on the display. Here, the amount of binocular disparity on the display is the product of the ratio of the display size W0 to the imaging element sensor size pw and the enlargement rate (display magnification rate) of the image specified by the user. With this relationship, the amount of binocular disparity of the subject on the display is expressed with the following Equation.

$$Qx = W0/pw \times f \times SB/R \times \text{(enlargement rate)} \qquad \text{(Equation 2)}$$

(b) FIG. 9 illustrates the alignment adjustment that shifts the image in a left and right direction (horizontally) to adjust the amount of binocular disparity illustrated in (a) in FIG. 9 to zero. With a typical parallel twin lens camera, the 3D display is made easier to view by performing adjustment that matches the pop-out of the subject on the display (i.e., adjusts the pop-out to be zero). The alignment adjustment amount DL of the left-eye image and the adjustment amount DR of the right-eye image are expressed with the following Equation.

$$DL = Qx/2 \qquad \text{(Equation 3)}$$

$$DR = Qx/2 \qquad \text{(Equation 4)}$$

Note that the above alignment adjustment example is just one example of a typical adjustment method, and alignment adjustment to reflect the intention of the photographer or creator of the 3D image is not limited to this example.

Next, a method for calculating the alignment adjustment amount used by the adjustment unit 105 in the image processing device 100 will be described. For illustrative purposes, a method for calculating the alignment adjustment amount when a plurality of cameras having parallel optical axes are used (i.e., when a parallel multi-lens camera is used) will be given.

Figure 10:
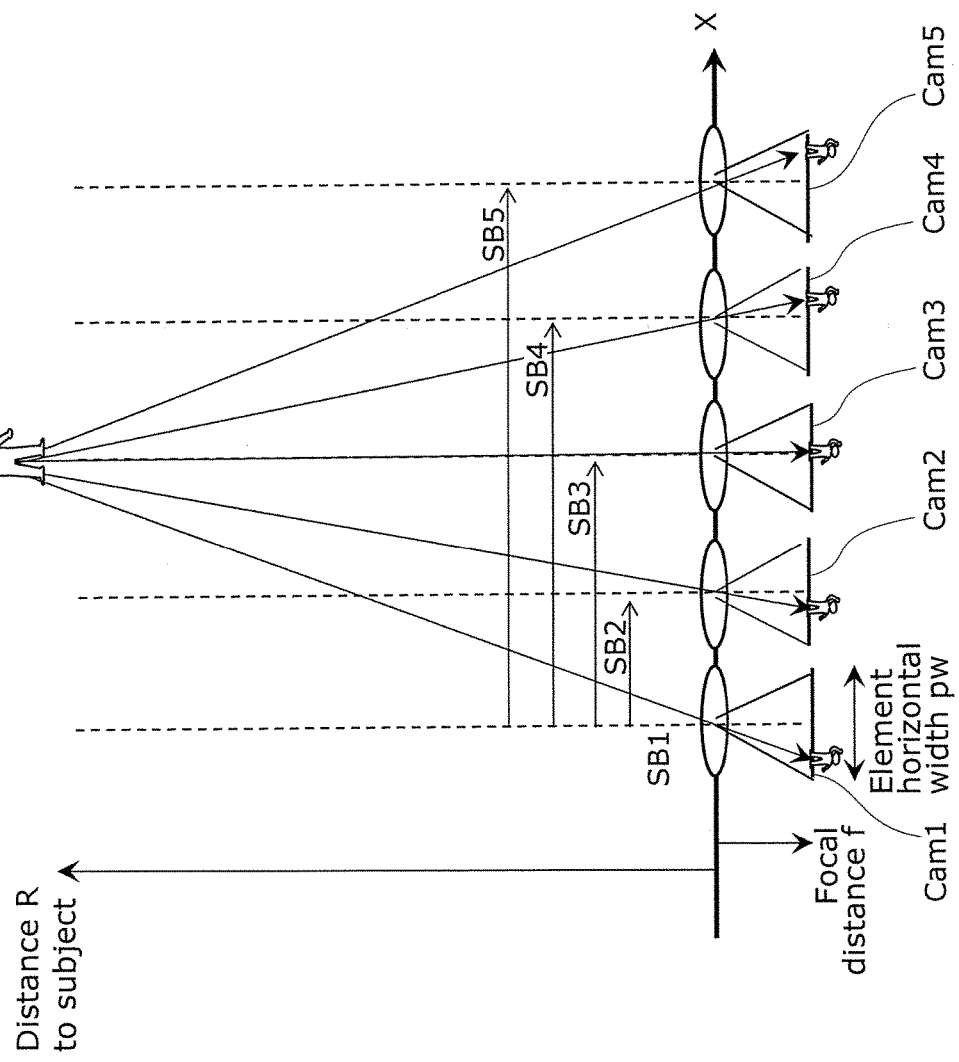
FIG. 10 illustrates how it would appear if multiple images including the same subject were captured according to Embodiment 1.

FIG. 10 illustrates how it would appear if multiple images including the same subject to be used by the image processing device 100 were captured. FIG. 10 also illustrates five cameras—Cam1, Cam2, Cam3, Cam4, and Cam5—used to capture the same subject from different perspectives. The amount of binocular disparity between the five cameras is calculated with the follow equation, similar to Equation 1.

$$Q'x(SB) = f \times SB/R \qquad \text{(Equation 5)}$$

The variable SB in Equation 5 is any one of SB1, SB2, SB3, SB4, and SB5, each of which is a value indicating the difference between the point of origin (for example, the position of Cam1) and a corresponding position of one of the Cam1, Cam2, Cam3, Cam4, and Cam5.

Figure 11:
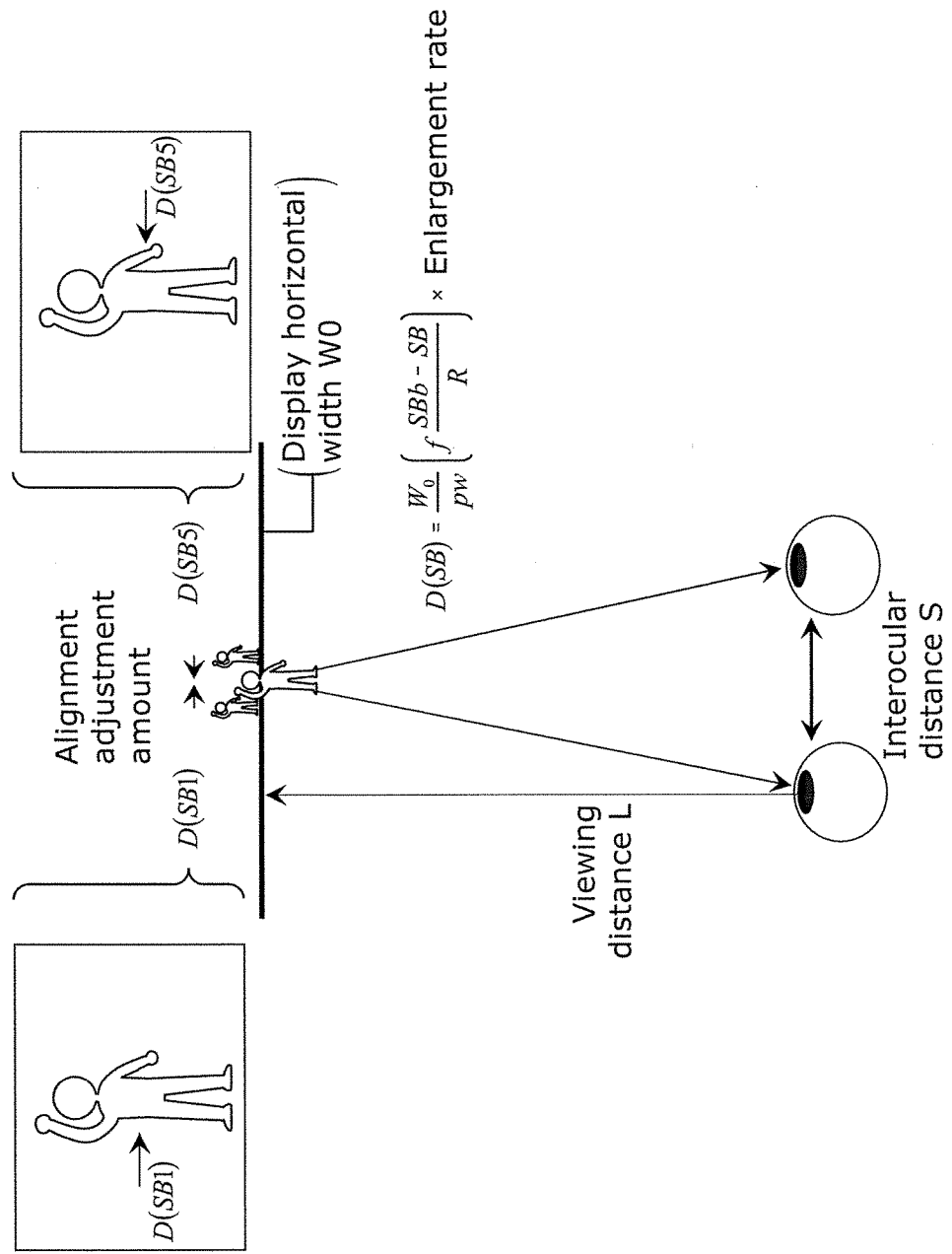
FIG. 11 illustrates alignment adjustment performed by an adjustment unit according to Embodiment 1.

FIG. 11 illustrates the alignment adjustment performed by the adjustment unit 105 in the image processing device 100. More specifically, FIG. 11 illustrates an adjustment method in which the pop-out of a specified subject (for example, a person) in the 3D display is matched on the display (i.e., a method in which the projection amount is adjusted to zero) when a 3D image is formed from one image captured by Cam1 and one image captured by Cam5. When the images include a plurality of subjects, any method may be used to specify a subject. The adjustment unit 105 calculates the alignment adjustment amount with the following equation based on, for example, SB information (an SB value), which is a capturing condition of the two images selected by the selection unit 102.

$$D(SB) = W0/pw \times f \times (SBb - SB)/R \times \text{(enlargement rate)} \qquad \text{(Equation 6)}$$

The variable SB in Equation 6 is also any one of SB1, SB2, SB3, SB4, and SB5, each of which is a value indicating the difference between the point of origin (for example, the position of Cam1) and a corresponding position of one of the Cam1, Cam2, Cam3, Cam4, and Cam5. SBb is an SB value expressed as a relative location from the point of origin with reference to the reference position indicated in the reference position information 114. D(SB) is, in a 3D image formed from image A captured at capturing position SB and image B that would be obtained if the capturing position were the reference position, equivalent to the amount of alignment adjustment performed on image A to adjust the amount of binocular disparity on the display to zero. With this, the alignment adjustment amount D(SB) for each image captured by the cameras can be calculated independent from other images.

Then, as illustrated in FIG. 11, the adjustment unit 105 performs alignment adjustment (image shift) of an alignment adjustment amount D(SB1) on the image captured by Cam1, and performs image shift of an alignment adjustment amount D(SB5) on the image captured by Cam5. By performing this sort of alignment adjustment, the adjustment unit 105 can display the subject at approximately the same position at any time, without having to depend on the pair of images forming the 3D image and selected by the selection unit 102.

The difference between this alignment adjustment performed by the adjustment unit 105 and alignment adjustment performed by a typical parallel twin lens camera (see FIG. 8 and FIG. 9) will be described next.

The calculation method of the alignment adjustment amount in a typical parallel twin lens camera is expressed as the following equation, which is an arrangement of Equation 2.

$$D'(SB) = W0/pw \times f \times \{(SBR + SBL)/2 - SB\}/R \times \text{(enlargement rate)} \qquad \text{(Equation 7)}$$

The variable SB is SBL, which is an SB value of the left-eye image, or SBR, which is an SB value of the right-eye image. Moreover, (SBR+SBL)/2, which is generally the center between the capturing positions of the left-eye image and the right-eye image, is used as the reference position SBb. When Equation 7 is used, the alignment adjustment amount DL and DR of the left-eye image and the right-eye image are expressed as followed.

$$DL = D(SBL) = W0/pw \times fx\{(SBR+SBL)/2-SBL\}/R \times \text{(enlargement rate)} \quad \text{(Equation 8)}$$

$$DR = D(SBR) = W0pw \times fx\{(SBR+SBL)/2-SBR\}/R \times \text{(enlargement rate)} \quad \text{(Equation 9)}$$

In this way, as can be seen from Equation 8 and Equation 9, alignment adjustment in a typical parallel twin lens camera is dependent on either the capturing position of the left-eye image or the capturing position of the right-eye image to be paired with.

However, with the image processing method used by the image processing device 100, the alignment adjustment amount can be independently calculated for one image with Equation 6, without having to depend on the other image in the pair of two images forming the 3D image.

1-3. Advantageous Effect

As described above, in Embodiment 1, the image processing device 100 stores, in the storage unit 104, a group of images obtained by capturing the same subject from at least three perspectives, and selects, with the selection unit 102, two images from the group of images based on a viewing condition. Cropping is performed by the adjustment unit 105 on the two selected images as needed to change the magnification rate (enlargement or shrinking), a left-eye image and a right-eye image to be used to form the 3D display image are specified, and alignment adjustment is performed. Alignment adjustment by the adjustment unit 105 is performed as follows based on the SB information 111 and the reference position information 114 stored in the storage unit 104. The alignment adjustment is performed on the left-eye image so as to shift a position of the specified subject (for example, a person) in the left-eye image to a position in which the specified subject would appear if the capturing position of the left-eye image were the reference position. The same adjustment processing is performed on the right-eye image. With this, even when any given perspective image is selected as the left-eye image and any given perspective image is selected as the right-eye image in accordance with a viewing condition, positions of a specified subject in can be aligned when displayed in 3D since image shift can be performed with reference to a reference position arbitrarily set in advance for each image.

Moreover, in Embodiment 1, the image processing device 100 performs the process step S102 as a first selection step of selecting two images to form the 3D display image in accordance with a viewing condition for the 3D display image. The image processing device 100 then performs the process step S103 as a first adjustment step of performing adjustment processing such as alignment processing on the left-eye image and the right-eye image specified via the selection made in the first selection step, and displays the 3D image. Next, when it is determined in process step S101 that the viewing condition (display magnification rate) has changed, the image processing device 100 performs the process step S102 as a second selection step of making the selection in accordance with the changed viewing condition if a prescribed determination condition is not met. The image processing device 100 then performs the process step S103 as a second adjustment step of performing adjustment processing such as alignment processing on at least one image among the left-eye image and the right-eye image specified via the selection made in the second selection step, and displays the 3D image. With this, even when at least one image among the left-eye image and the right-eye image changes in accordance with a change in the viewing condition of the 3D display image, the position of the subject in the changed image can be aligned, via adjustment processing, with a position the subject would be in if the subject were captured from the reference position. This makes viewing more effortless for the user.

Moreover, in Embodiment 1, when the two images selected by the selection unit 102 of the image processing device 100 include an image that is the same as either of the two images before that selection, the alignment adjustment and such is not performed by the adjustment unit 105 as a result of the determination in process step S201. This increases processing efficiency.

Moreover, in Embodiment 1, alignment adjustment is performed on the two images selected by the selection unit 102 of the image processing device 100 such that the position of the subject in the image obtained as a result of the magnification rate change (e.g., enlargement) by the adjustment unit 105 is shifted to a position the subject would be in from the perspective from the reference position. With this, even when magnification processing (enlargement, shrinking, etc.) is performed on an image and the image is displayed in 3D, the position of the subject in the magnification processed image can be shifted. Note that in an implementation example in which magnification processing and alignment adjustment (image shift) are carried out as mutually independently as possible, since alignment adjustment is not performed on images that are unchanged before and after a selection is made, processing efficiency can be increased.

Moreover, in Embodiment 1, when the reference position is determined to be a prescribed position between capturing positions of any two images among the group of images obtained by capturing the same subject from different perspectives, the probability that the reference position falls between the capturing positions of the two images selected by the selection unit 102 increases to a certain extent. Consequently, loss of image information from performing image shift on the left-eye image and the right-eye image as a result of the alignment adjustment by the adjustment unit 105 can be reduced to a certain extent.

Moreover, in Embodiment 1, the left-eye image and the right-eye image subjected to adjustment processing by the adjustment unit 105 of the image processing device 100 are displayed by the display unit 106. With this, the user can view the 3D image, and since the horizontal position of the specified subject (i.e., a person) in the 3D display does not vary even when there is a change in a viewing condition, the user can effortlessly view the 3D image.

Other Embodiments

Hereinbefore, Embodiment 1 was given as an example of the techniques disclosed in the present disclosure. However, the techniques in the present disclosure are not limited to this example; appropriate modifications, interchanges, additions, omissions, etc., to the embodiment are possible.

In Embodiment 1, two images are selected from a group of images, but an application of a naked-eye 3D display including multiple binocular disparities that display three or more images may be used. In this case, the selection unit 102 selects three or more images, and the adjustment unit 105 performs the alignment adjustment and such described above on each of the selected images. Moreover, the display device described in Embodiment 1 may be a device having a screen in the front surface, such as a liquid crystal display or an organic EL display, and, alternatively, may be a system in which a display is achieved by a video (image) being projected onto a screen, such as with a projector.

Moreover, as an example in Embodiment 1, using a change in the display magnification rate as a trigger, the two images are reselected from the group of images, adjustment processing is performed, and a 3D image is displayed (see FIG. 4). However, other than a change in display magnification rate, a change in a viewing condition described above may be used as a trigger whereby images are reselected and adjustment processing is performed.

Figure 12:
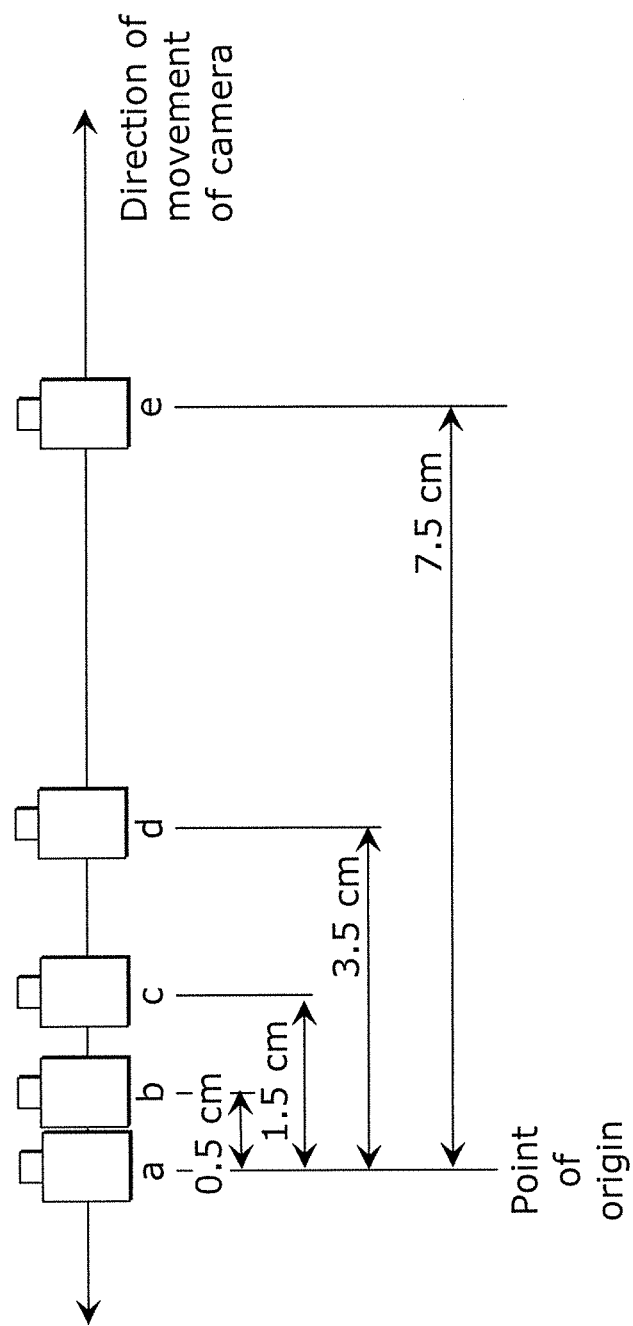
FIG. 12 illustrates capturing positions (SB information) for images according to another embodiment.

Moreover, in Embodiment 1, the capturing positions of cameras used to capture a subject from different perspectives is exemplified as illustrated in FIG. 2, but a configuration in which cameras having capturing positions a through e illustrated in FIG. 12 is also acceptable.

As illustrated in FIG. 12, when position a is the point of origin, position a is 0 cm, position b is 0.5 cm, position c is 1.5 cm, position d is 3.5 cm, and position e is 7.5 cm. From five images captured at these five capturing positions, there are total of 10 possible pairs of images for forming the 3D image. None of the SB values between the two images of each of the 10 pairs overlap with one another. In this way, reducing the total number of images while appropriately assigning a number of capturing positions that make it possible to cover a broad stereo base is also advantageous from the perspective of efficient use of the storage medium storing the group of images. For example, assuming two images will be selected to specify a left-eye image and a right-eye image to be used in a 3D display image in the image processing device, the group of images, which are the candidates for selection, are stored in the storage unit (storage medium) in advance. In this case, storing a group of images in which the distance between capturing positions related to any pair of images in the group of images is different than the distance between capturing positions related to any other pair of images in the group of images in the storage unit increases storage efficiency.

Moreover, in Embodiment 1, SB information expresses each capturing position as an SB value which is a distance (relative position) from the point of origin, but SB information may express each capturing position as an SB value which is a relative position from a determined reference position. In this case, so long as the SB information is stored in the storage unit 104, information which indicates the reference position itself is unnecessary. In other words, by setting SBb to zero in Equation 6, the alignment adjustment amount for each image can be calculated with Equation 6 based on SB information.

Moreover, in Embodiment 1, the optical axes of the cameras used to capture the subject at the capturing positions are exemplified as being parallel to each other, but the optical axes do not necessarily need to be parallel to each other. When the optical axes of the cameras are aligned to have toe-in rather than to be parallel and the images are captured for cross-viewing method, keystone correction to remove keystone image distortion can be performed, and the same processing as when the optical axes are parallel can be performed. Moreover, in Embodiment 1, the subject is fixed and the camera is moved to change the capturing position, but the camera may be fixed and the subject may be rotated or moved to obtain images that achieve the same effect as viewing the subject from different perspectives. Moreover, a plurality of cameras may be used.

Moreover, in Embodiment 1, alignment adjustment in which the projection of a specified subject in the 3D display is matched on the display (i.e., the amount of pop-out is adjusted to zero) is exemplified, but matching the pop-out on the display is not necessarily required. An adjustment method may be uniformly used in which the position of specified subject is adjusted to recede by a prescribed amount from the display or pop out by a prescribed amount from the display (i.e., uniformly adding or subtracting an offset value to the alignment adjustment amount).

Moreover, in Embodiment 1, an example compatible even when magnification processing (enlargement, shrinking) is performed on an image is given, and Equation 6 includes an enlargement rate variable, but enlargement and shrinking do not necessarily need to be performed. Thus, when enlargement and shrinking of an image is not to be performed, a constant value of "1" may be inserted in Equation in place of the enlargement rate. For example, alignment adjustment may be performed on images as captured, without performing magnification processing, and those images may be used as the left-eye image and the right-eye image forming the 3D display image.

Moreover, in the image processing device described in Embodiment 1, each functional element (functional block) may be realized as an individual chip, as a semiconductor device such as an integrated circuit (IC) or an large scale integrated (LSI) circuit. Moreover, the method of circuit integration is not limited to LSI. Integration may be realized with a specialized circuit or a general purpose processor. After manufacturing the LSI circuit, a field programmable gate array (FPGA) or a reconfigurable processor that allows reconfiguration of the connection or configuration of the inner circuit cells of the LSI circuit can be used. Furthermore, when advancement in semiconductor technology or derivatives of other technologies brings forth a circuit integration technology which replaces LSI, it will be appreciated that such a circuit integration technology may be used to integrate the functional blocks. Application of biotechnology is also a possibility.

Moreover, each process in Embodiment 1 may be realized via hardware, and may be realized as software (includes an operating system (OS), middleware, and a prescribed library). Each process may also be realized as a combination of both software and hardware. Note that when the image processing device according to Embodiment 1 is realized as hardware, it goes without saying that timing adjustment is required for performing each process. In Embodiment 1, for ease of explanation, details regarding timing adjustment of each signal generated by actual hardware design are omitted.

Moreover, the sequence in which the processing method is executed in Embodiment 1 is not necessarily limited to the sequence exemplified in Embodiment 1; so long as it does not depart from the scope of the invention, the sequence may be rearranged.

Moreover, each functional element in the image processing device 100 described in Embodiment 1 may be separately installed in individual devices. Here, functional elements separately installed in individual devices operate in conjunction with each other by communicating with one another wirelessly or over a wired connection to realize the same image processing method as the image processing device 100 described in Embodiment 1.

Moreover, the selection unit 102 described in Embodiment 1 may be realized as, for example, a stereoscopic display device, television, mobile device, PC, digital still camera, video camera, information recording and playback device, video recording and playback device, or video processing device equipped with the selection unit 102. Note that in this case, images obtained by capturing the same subject from a plurality of different perspectives may be input into said device from an external device. Moreover, the adjustment unit 105 described in Embodiment 1 may be realized as, for example, a stereoscopic display device, television, mobile device, PC, digital still camera, video camera, information recording and playback device, video recording and playback device, or video processing device equipped with the adjustment unit 105. In this case, the selected two images forming the 3D display image, information related to a capturing condition for those images, and reference position information may be transmitted to said device from an external device.

As described above, the non-limiting embodiment has been presented by way of example of the techniques of the present disclosure. To this extent, the accompanying drawings and detailed description are provided.

Thus, the elements described in the accompanying drawings and the detailed description include not only elements indispensable to solve the outlined problem, but may also include elements not necessarily indispensable to solve the outlined problem in order to provide examples of the techniques. Thus, those elements not necessarily indispensable should not be deemed essential due to the mere fact that they are described in the accompanying drawings and the detailed description.

Moreover, the embodiment above shows examples of techniques according to the present disclosure. Thus, various modifications, replacements, additions, omissions, or the like can be made within the scope of the claims or in a scope equivalent to the scope of the claims.

Although only an exemplary embodiment of the present invention has been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present disclosure is applicable to devices which display 3D images.

The invention claimed is:

1. An image processing method for performing image processing on a first perspective image and a second perspective image, the first perspective image and the second perspective image forming a 3D display image and being specified via selection from a group of images, the group of images being obtained by capturing a subject from at least three different perspectives, the method comprising:
performing, using an adjustment unit, adjustment processing on the first perspective image based on a prescribed reference position and a capturing position for the first perspective image, the adjustment processing shifting a position of image data representing the subject in the first perspective image to a position in which the subject would appear if the capturing position for the first perspective image were the prescribed reference position, and
performing, using the adjustment unit, adjustment processing on the second perspective image based on the prescribed reference position and a capturing position for the second perspective image, the adjustment processing shifting a position of image data representing the subject in the second perspective image to a position in which the subject would appear if the capturing position for the second perspective image were the prescribed reference position.

2. The image processing method according to claim 1, comprising:

a first selection step of making the selection in accordance with a viewing condition for the 3D display image;
a first adjustment step of performing, on the first perspective image and the second perspective image specified via the selection made in the first selection step, the adjustment processing for the first perspective image and the adjustment processing for the second perspective image, respectively;
if the viewing condition changes, a second selection step of making the selection in accordance with the changed viewing condition, under a certain condition; and
a second adjustment step of performing the adjustment processing on at least one image among the first perspective image and the second perspective image specified via the selection made in the second selection step.

3. The image processing method according to claim 2, wherein when the first perspective image and the second perspective image specified via the selection made in the second selection step include an image that is unchanged from before the selection made in the second selection step, the adjustment processing is not performed on the unchanged image in the second adjustment step.

4. The image processing method according to claim 3, wherein
the selections made in the first selection step and the second selection step are each a selection of two images among the group of images,
the specified first perspective image and the specified second perspective image subject to the adjustment processing performed in the first adjustment step are two images obtained as a result of performing magnification processing on each of the two images resulting from the selection made in the first selection step, and
the at least one image subject to the adjustment processing performed in the second adjustment step is obtained as a result of performing magnification processing on at least one image among the two images resulting from the selection made in the second selection step.

5. The image processing method according to claim 2, further comprising
a determination step of determining a prescribed position between capturing positions of any two images among the group of images to be the prescribed reference position,
wherein the adjustment processing performed in the first adjustment step and the adjustment processing performed in the second adjustment step are performed based on the prescribed reference position determined in the determination step.

6. The image processing method according to claim 2, further comprising
preceding the selection made in the first selection step, a storing step of storing, on a storage medium, the group of images and information indicating a capturing position of each image in the group of images,
wherein, among the group of images stored on the storage medium, a distance between the capturing positions of any given pair of images is different from a distance between the capturing positions of any other given pair of images.

7. The image processing method according to claim 2, further comprising:
a display step of displaying the first perspective image and the second perspective image subjected to the adjustment processing.

8. The image processing method according to claim 2, wherein
the selections made in the first selection step and the second selection step are each a selection of two images among the group of images,
the specified first perspective image and the specified second perspective image subject to the adjustment processing performed in the first adjustment step are the two images resulting from the selection made in the first selection step, and
the at least one image subject to the adjustment processing performed in the second adjustment step is at least one image among the two images resulting from the selection made in the second selection step.

9. The image processing method according to claim 1, wherein
the adjustment processing performed on the first perspective image shifts the position of the subject in the first perspective image to a position in which the subject would appear if the first perspective image were captured from the prescribed reference position with a camera whose optical axis is parallel to an optical axis of a camera used to capture the first perspective image, and
the adjustment processing performed on the second perspective image shifts the position of the subject in the second perspective image to a position in which the subject would appear if the second perspective image were captured from the prescribed reference position with a camera whose optical axis is parallel to an optical axis of a camera used to capture the second perspective image.

10. An image processing device that comprises a processor and memory and performs image processing on a first perspective image and a second perspective image, the first perspective image and the second perspective image forming a 3D display image and being specified via selection from a group of images, the group of images being obtained by capturing a subject from at least three different perspectives, wherein
as a result of the processor executing a control program stored in the memory, the image processing device performs:
adjustment processing on the first perspective image based on a prescribed reference position and a capturing position for the first perspective image, the adjustment processing shifting a position of image data representing the subject in the first perspective image to a position in which the subject would appear if the capturing position for the first perspective image were the prescribed reference position; and
adjustment processing on the second perspective image based on the prescribed reference position and a capturing position for the second perspective image, the adjustment processing shifting a position of image data representing the subject in the second perspective image to a position in which the subject would appear if the capturing position for the second perspective image were the prescribed reference position.

\* \* \* \* \*